United States Patent

Small et al.

[11] Patent Number: 5,812,142
[45] Date of Patent: Sep. 22, 1998

[54] MOTION MOVEMENT CUEING THROUGH SYNCHRONIZED DISPLAY PORT AND IMAGE

[75] Inventors: Ian S. Small, Cupertino; Richard I. Mander, Menlo Park; Michael Chen, Palo Alto, all of Calif.

[73] Assignee: Apple Computer, Inc., Cupertino, Calif.

[21] Appl. No.: 316,276

[22] Filed: Sep. 30, 1994

[51] Int. Cl.⁶ .................................................. G06T 3/00
[52] U.S. Cl. ............................................................ 345/438
[58] Field of Search ........................... 395/138, 133–135, 395/136, 118, 119, 120, 127, 152–154, 155, 157, 161, 920; 359/630; 273/148 B; 345/433–438, 418–420, 427, 473–475, 326, 327, 328, 340–342, 339, 355–358

[56] References Cited

U.S. PATENT DOCUMENTS 5,422,653  6/1995  Maguire, Jr. ..................... 359/630 X
5,436,638  7/1995  Bolas et al. ....................... 273/148 B

*Primary Examiner*—Almis R. Jankus
*Attorney, Agent, or Firm*—V. Randall Gard

[57] ABSTRACT

A user interface provides, in a fixed screen display, for both decoupling head and body turning and for integrating them without the need for specialized equipment. Using successive synchronized viewport and contained display image movement steps, the present invention first cues the user that their body is facing in the same direction as their head. Then, by simulating the head-turn/body-turn process that humans follow when looking around for something, the invention cues the user to understand that when they look around, they are turning first their head and then their body.

12 Claims, 8 Drawing Sheets

(a)
(b)
(c)
(d)
(e)
(g)
(h)
(i)
(j)

MOTION MOVEMENT CUEING THROUGH SYNCHRONIZED DISPLAY PORT AND IMAGE

FIELD OF THE INVENTION

The present invention relates generally to the field of human-computer interfaces. More specifically, the present invention relates to a technique for providing a human-computer interface with real-world orientation cues when simulating viewer movement in two dimensional and three dimensional virtual environments.

BACKGROUND OF THE INVENTION

Navigation of three-dimensional spaces is a complex process which people manage in the real world by relying on a multiplicity of sensory cues and feedback. Electronic or computer-based three-dimensional spaces lack many of these sensory cues, and aside from the limited field of view image typically displayed on the computer screen, generally offer weak feedback mechanisms. Users of these spaces often become lost or disoriented, unsure of where they are, where they are looking, where they can go, and where they have been.

One of the basic problems stems from a confusion about the displayed image or view the user sees on the screen, and whether it represents the direction in which their body is facing (if they were to walk "forward") or just the direction their head is facing. In the real world, the user knows whether or not their head is rotated relative to their body. The head-body relationship is very important because the user implicitly understands that the direction the body is facing is the walking direction whereas the direction the head is facing is the current view of the world. In the detached world of the computer, it is not so easy to communicate the direction in which the body is facing independent of or relative to the view of the world currently being displayed.

For simplicity, prior approach interfaces often lock the head to the body, and forbid left-right rotation of the head independent of the body. This effectively reduces the degrees of freedom in the user's virtual body, in theory reducing the complexity. The problem with this approach is that users are aware of what they can do in the real world, and have the same expectations in the virtual one. Unfortunately, not only is this locked relationship not what the users expect, the relationship is hidden from them.

SUMMARY AND OBJECTS OF THE INVENTION

It is an object of the present invention to provide an improved user interface for navigation in a computer system.

It is a further object of the present invention to provide an improved navigation approach to the user interface to a computer system.

It is a still further object of the present invention to provide an improved user interface navigational approach which more realistically conveys the real world movements being depicted within an electronic computer system.

It is an even further object of the present invention to provide an improved user interface navigational approach which provides the user of a computer system with a more intuitive understanding of movements as depicted within the user interface of the computer system.

The foregoing and other advantages are provided by a method for a user of a computer system to navigate within an interface of said computer system, said computer system comprising a processor, a display and an input device, said computer interface comprising a view port having a starting position and containing a display image, said user navigation method comprising the following steps: a) if said user indicates a desire to navigate in a specified direction within said computer system interface by utilizing said input device then said view port slides in said specified direction at a predetermined view port movement rate, and said display image shifting within said view port and in a direction opposite to said specified direction at a rate synchronized with said predetermined view port movement rate; b) if said view port reaches a view port movement limit then said view port no longer slides, but said display image continues to shift within said view port in a direction opposite to said specified direction; and, c) if said user indicates a desire to no longer navigate in said specified direction within said computer system interface by utilizing said input device then said view port returns to said starting position, and said display image no longer shifts in said direction opposite to said specified direction.

The foregoing and other advantages are also provided by an apparatus for a user of a computer system to navigate within an interface of said computer system, said computer system comprising a processor, a display and an input device, said computer interface comprising a view port having a starting position and containing a display image, said user navigation apparatus comprising the following: a) if said user indicates a desire to navigate in a specified direction within said computer system interface by utilizing said input device then means for said view port slides in said specified direction at a predetermined view port movement rate, and means for said display image shifts within said view port in a direction opposite to said specified direction and at a rate synchronized with said predetermined view port movement rate; b) if said view port reaches a view port movement limit then means for said view port no longer slides, but means for said display image continues to shift within said view port in a direction opposite to said specified direction; and, c) if said user indicates a desire to no longer navigate in said specified direction within said computer system interface by utilizing said input device then means for said view port return to said starting position, and means for said display image no longer shifts in said direction opposite to said specified direction.

Other objects, features and advantages of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE INVENTION

Figure 8:
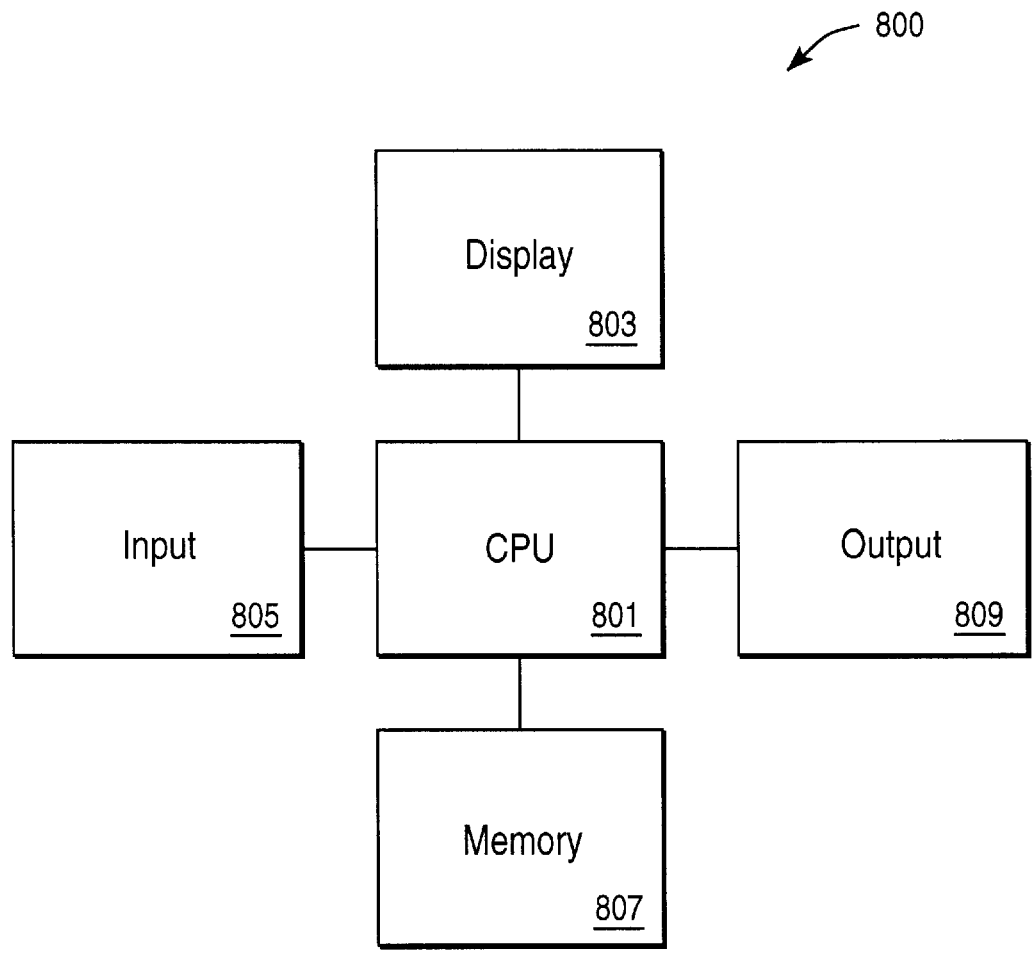
FIG. 8 depicts a simplified block diagram of a computer system for the present invention.

The present invention will be described below by way of a preferred embodiment as an improvement over the aforementioned computer user interface systems, and implemented on an Apple Macintosh® (trademark of Apple Computer, Inc.) computer system. It is to be noted, however, that this invention can be implemented on other types of computers and electronic systems. Regardless of the manner in which the present invention is implemented, the basic operation of a computer system 800 embodying the present invention, including the software and electronics which allow it to be performed, are described with reference to the block diagram of FIG. 8, wherein numeral 801 indicates a central processing unit (CPU) which controls the overall operation of the computer system, numeral 803 indicates a standard display device such as a cathode ray tube (CRT) or liquid crystal display (LCD) screen, numeral 805 indicates an input device which may include both a standard keyboard and a pointer-controlling device such as a mouse as well as a microphone or other sound input device, numeral 807 indicates a memory device which stores programs according to which the CPU 801 carries out various predefined tasks, and numeral 809 indicates an output device which may include a loudspeaker for playing sound.

Visual Design

When humans look around in the real world, they tend to turn their head through a limited arc of rotation. When that isn't far enough, they start turning their bodies. If the point of interest is known to be farther away than a simple head-turn can accomplish, humans typically start turning their bodies sooner, but still lead body rotation with head rotation so that they can see what is coming.

Figure 1:
FIG. 1 depicts key frames from traditional visual feedback during look-to-the-right action.

In traditional user interfaces for computer-based three-dimensional spaces, when the user wants to look to the right, the system provides a sequence of visual feedback similar to the column of display images shown in FIG. 1. In this sequence, the virtual camera is rotating to the right, with the result that the content of the display images shown is shifting to the left, with changes in perspective as appropriate. The display image sequence shown provides no clue as to whether it is the user's virtual body or virtual head that is rotating: the sequence would be identical in either case.

Horizontal rotation is the simplest application of the present invention technique referred to herein as a Motion-Cueing View Window. The sequence of display images shown in FIG. 2 uses key frames (representative display images) in the interaction to demonstrate how the Motion-Cueing View Window simulates the head-turn/body-turn process by sliding a view port (the image area or window) as well as changing the displayed image within the view port, thus reinforcing for the user the fact that their virtual body is also turning. One embodiment of the motion-cueing view window has three stages: the Head-Turn Stage, the Body-Turn Stage, and the Recentering Stage.

When the user wants to look to the right, first the view port slides to the right, with the content of display images shown shifting to the left within it. This first stage, dubbed the Head-Turn Stage, simulates the initial head-turn and can be seen in Figure display images 2(*a*) through 2(*d*).

Figure 3:
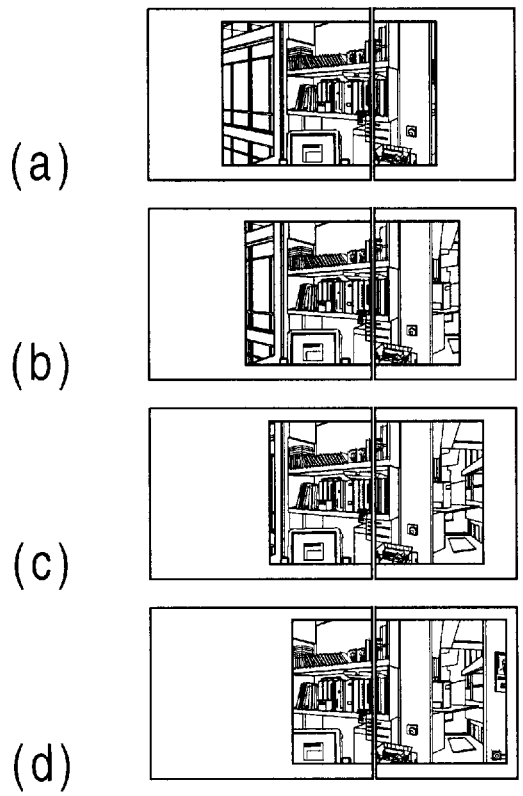
FIG. 3 depicts synchronization between display image movement and view port panning.

One key to the Head-Turn Stage is the synchronization between the view port sliding and the display image shifting within it. Ideally, the sliding and shifting will be synchronized so that objects within the display image will appear to be fixed to the screen, with the view port appearing to pan over them, as shown in FIG. 3. Note how the same part of the display image lies beneath the vertical line drawn through the display images in Figure display images 3(*a*) through 3(*d*).

Once a prescribed view port slide limit is reached, the view port stops sliding right, but the content of the display images shown continues to shift left to reflect the body's continued rotation to the right. This stage, dubbed the Body-Turn Stage, simulates the user's body turning and can be seen in Figure display images 2(*e*) through 2(*h*).

Finally, when the user has reached the view in which they are interested (the view port contains the desired display image), turning stops and the view port slides back left to the center (starting) position. The display image remains fixed within the view port as the view port slides back to the center of the window. This stage, dubbed the Recentering Stage, simulates the body rotation catching up with the head's lead rotation, and is shown in Figure display images 2(*i*) and 2(*j*).

Figure 2:
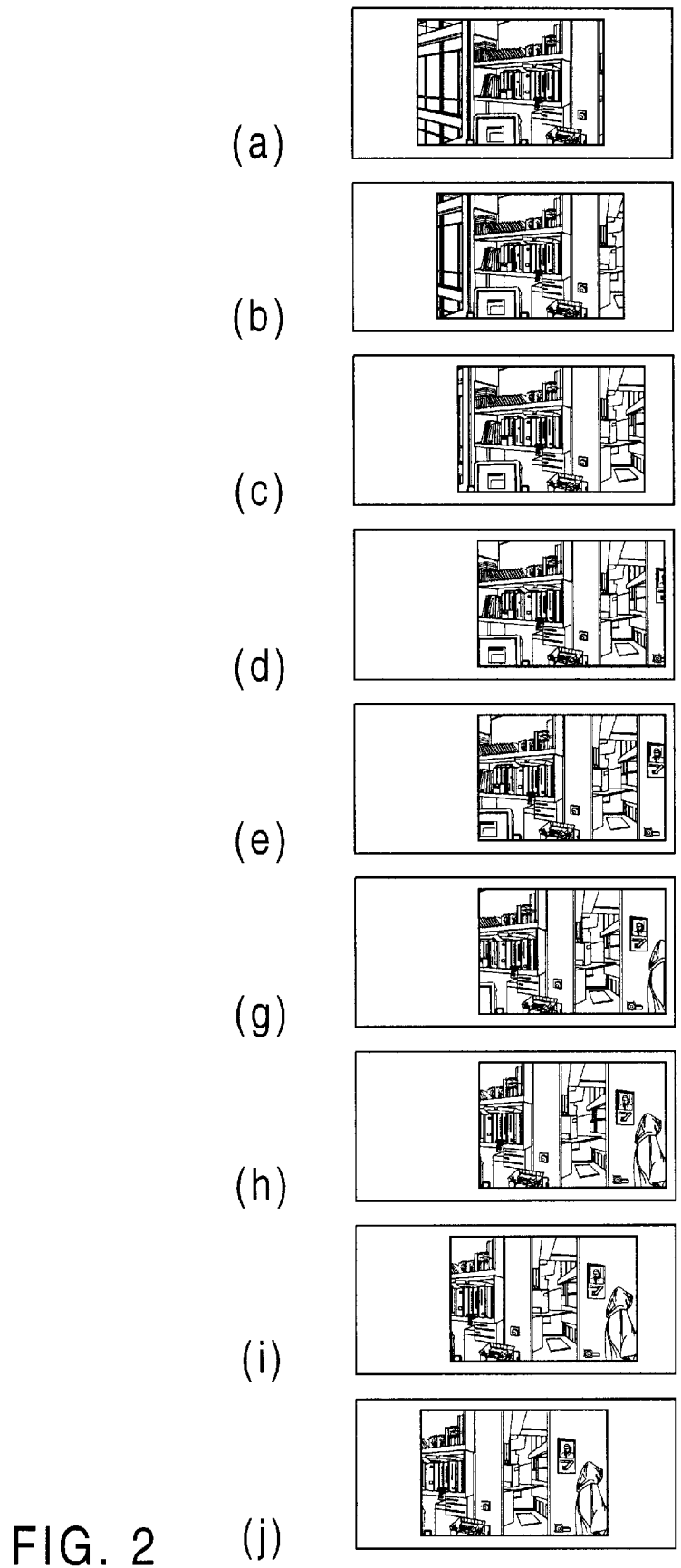
FIG. 2 depicts key frames from visual feedback from the Motion-Cueing View Window during look-to-the-right action.

Note that the display image key frames shown in FIG. 2 for each stage are for illustration only; the number of images actually shown in each stage depends on the implementation, the rendering engine complexity, the overall system performance, the edge margin width and the user's interactive input, among other possible factors.

The example shown in FIG. 2 works similarly for turning to the left: if the user wanted to look to the left, rather than to the right, the view port would slide leftward until it hit the prescribed limit, with the content of the display images shifting to the right within it. Once the desired display image view had been reached, the view port would slide back to the center position (by sliding right).

While the example above shows only one-dimensional left-right rotation, it is possible to use the Motion-Cueing View Window in more than one-dimension. For many applications, only one-dimension is appropriate, because while it simplifies matters to lock the virtual head to the virtual body for horizontal rotation, there may be no reason to do so for vertical rotation. When a human being looks up in traditional three-dimensional space, their body is still pointed forward, rather than now being pointed upward, so it may be most appropriate to use the Motion-Cueing View Window for horizontal view rotation yet not for vertical view rotation. In this case, the Motion-Cueing View Window would be used for horizontal rotation, with a traditional rotation sequence like that shown in FIG. 1 being used for vertical rotation.

However, there are applications of the Motion-Cueing View Window in two-dimensions useful for navigating in less constrained environments, such as underwater or in space. In virtual spaces simulating such environments, it may be desirable to unlock the head from the body in both directions of rotation. Therefore, a two-dimensional Motion-Cueing View Window (one which slides up and down as well as left and right) would be appropriate for these cases, as well as for others not specifically called out here.

Alternative Embodiments

The three-stage implementation described above is only one embodiment of the Motion-Cueing View Window. Rather than having distinct Head-Turn and Body-Turn Stages, the two stages can be combined.

In an integrated Head-Turn/Body-Turn Stage, the sliding of the view port is synchronized with the shifting of the display image content in a manner which conveys the combination of head-turning and body-turning. In FIG. 3, the image content position was fixed relative to the screen, with the view port sliding over it, in order to convey a rotating head on a fixed body.

Figure 4:
FIG. 4 depicts key frames from visual feedback from the Combined-Turn Stage implementation of the Motion-Cueing View Window during look-to-the-right action.

FIG. 4 shows key frames (representative display images) from the sequence of display images which would result if the model is simulating simultaneous head- and body-turning through the initial rotation. In Figure display images 4(a) through 4(c), both head and body are rotating, dubbed the Combined-Turning Stage. Figure display images 4(d) and (e) represent the Body-Turn Stage, with only the body rotating, as indicated by display image movement only without further view port sliding. Figure display images 4(g) and (h) represent the familiar Recentering Stage wherein the view port returns to its center or starting position while holding the current display image constant therein.

Figure 5:
FIG. 5 depicts the relationship between display image movement and view port panning for the Combined-Turn Stage implementation.

An important difference between FIG. 4 and FIG. 2 lies in their first stage. Comparing FIGS. 5 and 3 demonstrates this difference. Whereas in FIG. 3 the display image content is fixed relative to the screen (as shown by the white line), FIG. 5 shows how the display image content is shifting at a faster rate than the view port is sliding, reflecting the combined speed of both head and body rotation. Note that the relative image shift (the relative change between display images) between the Figure display images 5(a), 5(b) and 5(c) (the Combined-Turn Stage) is the same as the display image shift between the Figure display images 5(c) and 5(d) (the Body-Turn Stage). When FIG. 4 is viewed interactively, the overall speed of rotation in Figure display images 4(a) through 4(e) appears to be constant, because the increased speed of rotation through the Combined-Turning Stage offsets the sliding of the view port.

The Head-Turn Stage and Combined-Turn Stage are not the only ways in which head and body turning can be implemented using the Motion-Cueing View Window. For instance, another embodiment of the Motion-Cueing View Window allows the first few frames of rotation to occur within a fixed view port, in order to simplify stepping the image right and left. These fixed frames of rotation correspond to an Eye Movement Stage, which can happen without moving the head or body. When eye movements are supported, the Combined-Turn Stage is a particularly desirable embodiment of the Motion-Cueing View Window. The actual speed of rotation of eye, head and body are all independent, and are implementation dependent.

Other embodiments of the Motion-Cueing View Window are possible by creating further combinations of the view port sliding mechanism, and the Eye-Movement, Head-Turn, Body-Turn, Combined-Turn and Recentering Stages described above.

Controlling Interface

There are a number of approaches to the controlling interface, of which we describe the two main variants: 'buttons' and 'in-view' interfaces. Other variants can be produced through combinations of these main approaches. For simplicity, only interfaces for the one-dimensional rotation case will be described here.

Buttons

Figure 6:
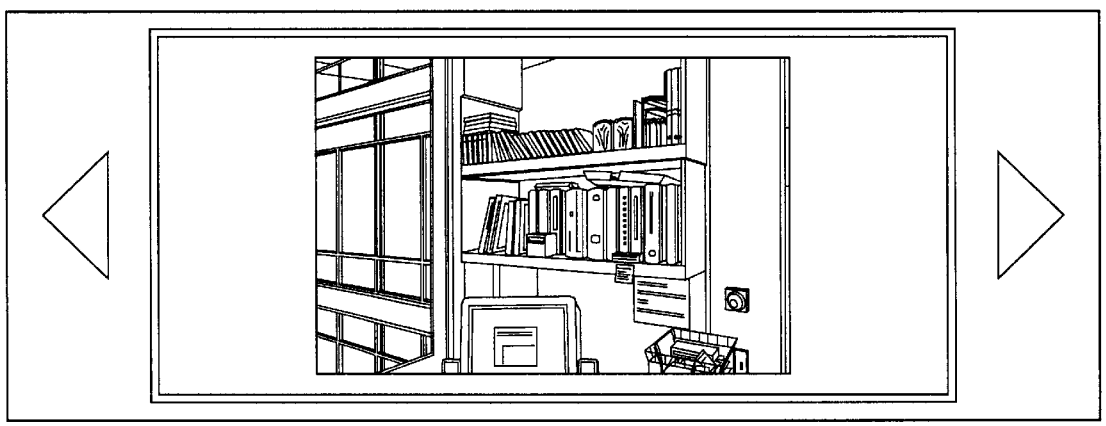
FIG. 6 depicts a two button interface approach to the Motion-Cueing View Window.

The simplest interface is to have distinct buttons apart from the view port. A two button case is shown in FIG. 6. Note that the buttons can be shown on-screen, as illustrated, or could be located in an external hard interface (e.g. a multiple button mouse, or game-oriented controller). Both cases are effectively the same. A button initiates looking in a particular direction; in the preferred embodiment, the right arrow button looks to the right, and the left arrow button looks to the left.

When the user presses and holds down the right arrow button:
the view port slides to the right, with the display image shifting to the left as shown in FIG. 2,
when the view port hits the limit, it stops sliding, but the display image continues to shift to the left, as shown in FIG. 2.
When the user releases the right arrow button:
the display image stops shifting,
the view port slides back to the center position, with the display image fixed within it.

The speed at which the view port slides, and the speed at which the display image shifts within it, may be held constant, or may depend on user actions other than the simple pressing of the button (mouse movement after the button, an independent speed control, etc.).

If the user releases the right arrow button while the view port is initially sliding to the right, the display image stops shifting and the view port slides back to the center position.

If the user simply clicks the right arrow button (doesn't hold it down for very long), the display image may shift within the view port, without the view port sliding at all.

Note that it is possible to combine the two buttons into a single button, with mouse movement of a cursor within the button providing further information. After the initial mouse down within the button, cursor position within the button controls the direction and possibly the movement rate. The Motion-Cueing View Window reacts accordingly (see In-View Interface below for the type of feedback experienced).

In-View Interface

Another approach is to have the user control the rotation directly on the display image.

In a simple on-screen joystick implementation, the user could control direction and rate of rotation. The user could click on the right half of the display image to look to the right, and on the left half of the display image to look to the left. The display image would appear to continue moving right or left as long as a control button is held down. Position relative to the center of the display image could control speed of rotation. Joystick implementations could also be implemented using external hardware controllers.

1) Initiating a movement

A hybrid joystick implementation would allow the user to drag the view port left or right (via a mouse or other direct manipulation controller), as appropriate, and would change to a joystick mode once the view port limit was reached. To look to the right, the user would mouse down anywhere in the view port and drag the mouse to the right. As the user drags the mouse to the right, the view port slides to the right as well. The exact mapping (1:1 mouse pixel:view port pixel, some other linear mapping, or a non-linear mapping) is implementation-dependent. As the view port slides to the right, the display image within it changes in synchronization as described above in "Visual Design." Once the view port reaches the right-most view port limit, the view port stops sliding. If the mouse is dragged farther to the right, the display image starts shifting within the view port. Speed of rotation could be related to the degree of offset between the mouse's current cursor position and its position when the right-most view port limit was reached.

2) Changing a movement

If the mouse is moved to the left of the mouse position at which the right-most view port limit was reached, the view port once again starts to track the mouse according to the mouse-view port mapping. The image within the view port changes in synchronization as described above in "Visual Design."

Note that within a single interaction, the user can look both left and right of the starting display image view angle, simply by dragging the view port left of center, and then back through center, and then right of center.

3) Ending a movement

If the mouse button is released, the view port slides from its current position back to the center, with the display image fixed within it.

Using this interface, the user can look left and right in small increments by dragging the view port left and right, without getting to the Body-Turn Stage of rotation.

Figure 7:
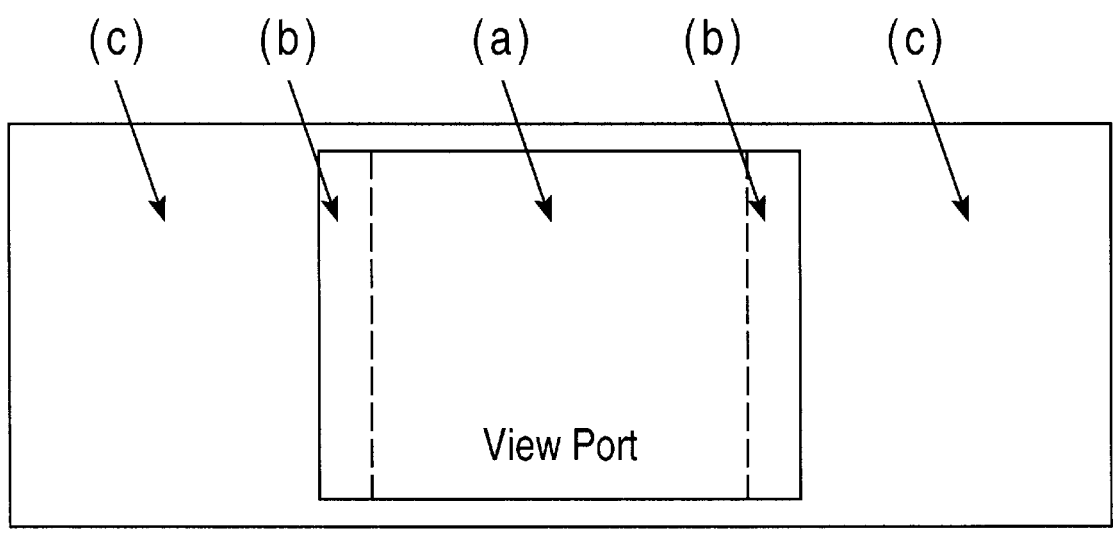
FIG. 7 depicts the use of the view port, border and margin areas as an interface to the Motion-Cueing View Window.

This type of interface could be combined with some buttons that provide step functionality. These buttons may be explicit external buttons, may be implicit buttons located in the margins at the left and right of the view port, or may be at the borders of the display image. FIG. 7 shows how the various areas of the view port and its surroundings might be used. The interior (a) of the view port triggers the standard Motion-Cueing View Window routines. Mouse clicks in the interior do not directly control the display image view angle. The outermost edges or borders (b) of the view port trigger both the standard Motion-Cueing View Window interaction routines on click and drag, but also trigger step functions on mouse click only. The right and left margins (c) act as step functions on mouse click, and as continuous rotate functions of the display image within the static view port (like FIG. 1) on mouse click and hold. Mouse click and drag in these regions is not differentiated from mouse click and hold, other than possibly affecting the rate of rotation of the display images within the static view port.

Note that these interfaces only demonstrate the one-dimensional rotation case. In cases where two-dimensional rotation is required, the interfaces described above can be directly extended to work in two-dimensions. Another extension would be to combine traditional vertical rotation with the one-dimensional Motion-Cueing View Window described above.

In the foregoing specification, the present invention has been described with reference to a specific exemplary embodiment and alternative embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

What is claimed is:

1. A navigation method for a user of a computer system comprising a processor, a display, an input device and an interface, said interface comprising a view port having a starting position and containing a display image, said navigation method comprising the following steps:
   a) if said user indicates a desire to navigate in a specified direction within said interface by utilizing said input device, then
      i) said view port sliding in said specified direction and at a predetermined view port movement rate, and
      ii) said display image shifting within said view port in a direction opposite to said specified direction and at a display image movement rate synchronized with said predetermined view port movement rate;
   b) if said view port reaches a view port movement limit, then
      i) said view port no longer sliding, and
      ii) said display image continuing to shift within said view port in a direction opposite to said specified direction; and,
   c) if said user indicates a desire to no longer navigate in said specified direction within said interface by utilizing said input device, then
      i) said view port returning to said starting position, and
      ii) said display image no longer shifting in said direction opposite to said specified direction.

2. The method of claim 1 wherein said synchronization of said display image movement rate with said predetermined view port movement rate occurs in a manner such that an object appearing in said display image within said view port appears to be fixed on said display of said computer system.

3. The method of claim 1 wherein said synchronization of said display image movement rate with said predetermined view port movement rate occurs in a manner such that an object appearing in said display image within said view port does not appear to be fixed on said display of said computer system and instead appears to be moving in a direction opposite to said specified direction.

4. The method of claim 1 wherein step a) includes, before said step i) of said view port sliding, the steps of:
   for a predetermined period of time and while said user continues to indicate a desire to navigate in said specified direction,
      A) said display image shifting within said view port and in a direction opposite to said specified direction;
      B) said view port remaining stationary;
   after said predetermined period of time and while said user continues to indicate a desire to navigate in said specified direction.

5. The method of claim 1 wherein said user utilizing said input device is accomplished by said user selecting a button adjacent said view port.

6. The method of claim 1 wherein said user utilizing said input device is accomplished by said user selecting a portion of said display image, said portion being indicative of said specified direction.

7. An apparatus for a user of a computer system to navigate within an interface of said computer system, said computer system including a processor, a display and an input device, said interface including a view port having a starting position and containing a display image, said apparatus comprising:
   a) means for, if said user indicates a desire to navigate in a specified direction within said interface by utilizing said input device, then
      i) sliding said view port in said specified direction and at a predetermined view port movement rate, and
      ii) shifting said display image within said view port in a direction opposite to said specified direction and at a rate synchronized with said predetermined view port movement rate;
   b) means for, if said view port reaches a view port movement limit, then
      i) no longer sliding said view port, and
      ii) continuing to shift said display image within said view port in a direction opposite to said specified direction; and
   c) means for, if said user indicates a desire to no longer navigate in said specified direction within said interface by utilizing said input device, then
      i) returning said view port to said starting position, and
      ii) no longer shifting said display image in said direction opposite to said specified direction.

8. The apparatus of claim 7 wherein said means for shifting said display image at a rate synchronized with said predetermined view port movement rate causes an object appearing in said display image to appear to be fixed on said display.

9. The apparatus of claim 7 wherein said means for shifting said display image at a rate synchronized with said predetermined view port movement rate causes an object appearing in said display image to appear to be moving in a direction opposite to said specified direction.

10. The apparatus of claim 7 wherein said user utilizing said input device is accomplished by means for said user to select a button adjacent said view port.

11. The apparatus of claim 7 wherein said user utilizing said input device is accomplished by means for said user to select a portion of said display image, said portion being indicative of said specified direction.

12. An apparatus for a user of a computer system to navigate within an interface of said computer system, said computer system including a processor, a display and an input device, said interface including a view port having a starting position and containing a display image, said apparatus comprising:

a) means for, if said user indicates a desire to navigate in a specified direction within said interface by utilizing said input device, then
  i) for a predetermined period of time and while said user continues to indicate a desire to navigate in said specified direction,
    A) said display image moving within said view port in a direction opposite to said specified direction;
    B) said view port remaining stationary;
  ii) after said predetermined period of time and while said user continues to indicate a desire to navigate in said specified direction,
    A) sliding said view port in said specified direction at a predetermined view port movement rate, and
    B) shifting said display image within said view port in a direction opposite to said specified direction and at a rate synchronized with said predetermined view port movement rate;

b) means for, if said view port reaches a view port movement limit, then
  i) no longer sliding said view port, and
  ii) continuing to shift said display image within said view port in a direction opposite to said specified direction; and c) means for, if said user indicates a desire to no longer navigate in said specified direction within said interface by utilizing said input device, then
  i) returning said view port to said starting position, and
  ii) no longer shifting said display image in said direction opposite to said specified direction.

* * * * *

UNITED STATES PATENT AND TRADEMARK OFFICE
CERTIFICATE OF CORRECTION

PATENT NO. : 5,812,142
DATED : September 22, 1998
INVENTOR(S) : Small, et al.

It is certified that error appears in the above-identified patent and that said Letters Patent is hereby corrected as shown below:

On title page, item [54] and col. 1, lines 1-3
In the Title:

change the title from "Motion Movement Cueing Through Synchronized Display Port and Image"

should read -Motion Cueing Through Synchronized Display Port and Image Movement--

Signed and Sealed this

Tenth Day of August, 1999

*Attest:*

Q. TODD DICKINSON

*Attesting Officer*     Acting Commissioner of Patents and Trademarks